United States Patent

Abe et al.

[11] Patent Number: 5,982,376
[45] Date of Patent: Nov. 9, 1999

[54] THREE-DIMENSIONAL GRAPHIC DISPLAY APPARATUS WITH IMPROVED HIGH-SPEED ANTI-ALIASING

[75] Inventors: Yuichi Abe, Hitachi; Ryo Fujita, Ibaraki-ken; Mitsuru Soga, Niigata-ken; Kazuyoshi Koga, Hitachinaka, all of Japan

[73] Assignee: Hitachi, Ltd., Tokyo, Japan

[21] Appl. No.: 08/607,246

[22] Filed: Feb. 14, 1996

[30] Foreign Application Priority Data

Feb. 14, 1995 [JP] Japan .................................. 7-024951

[51] Int. Cl.⁶ .................................................. G06T 15/00
[52] U.S. Cl. ................................................................ 345/422
[58] Field of Search .................................. 395/118–126; 345/418–426

[56] References Cited

FOREIGN PATENT DOCUMENTS 4-233086  8/1992  Japan .
5-290177  11/1993  Japan .
6-162209  6/1994  Japan .

OTHER PUBLICATIONS

A. Schilling, et al. "A New Simple and Efficient Antialiasing with Subpixel Masks", Computer Graphics, vol. 25, No. 4, Jul. 1991.

Foley et al. "Computer Graphics Principles & Practice" pp. 692–695, 1990.

*Primary Examiner*—Almis R. Jankus
*Attorney, Agent, or Firm*—Antonelli, Terry, Stout & Kraus, LLP

[57] ABSTRACT

A novel graphic display apparatus in which the pixel information for a multiplicity of layers arranged according to Z value including the color, the proportion in which the figure occupies the pixel and the Z value are held for each layer in a pixel memory. The Z value is compared between the pixel information of a newly-plotted figure and the multi-tiered pixel information held in the pixel information memory. In order to reduce the amount of memory space required, the pixel information stored in the bottom layer of the pixel memory is a combination of information synthesized from the color information having the Z value of the bottom layer and from at least one other layer having a Z value lower than the Z value associated with said bottom layer. In the case where the Z values are substantially equal to each other, the mask values included in each pixel information are summed and the pixel information to be written in the pixel information memory is determined by a pixel information computing section.

14 Claims, 8 Drawing Sheets n UNITS
CONFIGURATION OF PIXEL INFORMATION MEMORY

SCHEMATIC SECTIONAL
VIEW OF ONE PIXEL

| INPUT | COMPARISON | | OUTPUT | | | | |
|---|---|---|---|---|---|---|---|
| z_new z_1in z_2in w_1 w_2 | INPUT CONDITION | | A | B | C | D | E |
| | (A) | $z\_new > z\_1in + w\_1$ | 1 | 0 | 0 | 0 | 0 |
| | (B) | $z\_1in + w\_1 \geq z\_new \geq z\_1in - w\_1$ | 0 | 1 | 0 | 0 | 0 |
| | (C) | $z\_1in - w\_1 > z\_new > z\_2in + w\_2$ | 0 | 0 | 1 | 0 | 0 |
| | (D) | $z\_2in + w\_2 \geq z\_new \geq z\_2in - w\_2$ | 0 | 0 | 0 | 1 | 0 |
| | (E) | $z\_2in - w\_2 > z\_new$ | 0 | 0 | 0 | 0 | 1 |

THREE-DIMENSIONAL GRAPHIC DISPLAY APPARATUS WITH IMPROVED HIGH-SPEED ANTI-ALIASING

BACKGROUND OF THE INVENTION

The present invention relates to a graphic display apparatus for performing antialiasing processing in order to display a three-dimensional figure on the CRT or printer without any staircases or jags, and more in particular to a graphic display apparatus in which rearrangement of pixels along the depth is made at write level by holding a plurality of pixel information for each depth.

Normally, oblique lines or polygonal sides of a figure develop staircases or jags when displayed on a raster-scan display such as a CRT. This is caused by the fact that when a figure is developed in pixels, pixels covered by part of an edge of a polygon are presented either in the color of the particular figure or in the color of pixels external to the figure. In order to solve this problem, a method has conventionally been adopted in which the color of a given pixel is determined from the proportion of the area that a polygon occupies of the pixel to the area of the pixel.

JP-A-5-290177, for example, discloses a method for determining the proportion that a polygon occupies of a pixel using the inclination of an edge of the polygon.

According to JP-A-6-162209, on the other hand, there is disclosed a method involving a straight line and a rectangle, comprising a memory means equivalent to a frame buffer for holding an antialiased graphic image, a memory means equivalent to a Z buffer for holding a Z-value information for three-dimensional processing, and another memory means for storing a graphic image not antialiased, wherein in the case where another figure is plotted by a three-dimensional graphic plotter behind a figure once antialiased, the overlapped portion can be antialiased again. The description in this publication is not clear and contains inaccurate teachings as long as the present inventors understand them. Since at least connections of adjacent polygons are not taken into consideration, however, it seems that when a curved surface is displayed approximately by small triangles, the pixels between triangles cannot be accurately determined.

JP-A-4-233088 (corresponding to GB pat. Appln. Nos. 9014528.5 and 9014555.8 filed Jun. 29, 1990) is a disclosure of a method in which a figure is developed in pixels in such a way that several images with slightly displaced origins are synthesized to blend the colors of the pixels in the proportion of area of the images that represents each pixel. This method, in which a plurality of images are required to be generated and synthesized, takes a correspondingly longer processing time.

SUMMARY OF THE INVENTION

As described above, the conventional graphic display apparatuses pose the problems that connections of adjacent polygons cannot be displayed correctly and that the processing performance is not always high.

The object of the present invention is to provide a graphic display apparatus which is high in processing performance and which can correctly display the connections of adjacent polygons.

According to one aspect of the invention, there is provided a graphic display apparatus comprising a pixel generator for converting a figure having depth information into pixel information, a pixel memory for storing pixel information, a comparator for comparing the depth information contained in the pixel information stored in the pixel memory with the depth information contained in the pixel information newly converted by the pixel generator for each pixel position, and a pixel write section for determining and writing the pixel information to be written in the pixel memory in accordance with the output of the comparator, wherein each pixel information includes at least color information, a Z value as depth information and the proportion at which the figure occupies the pixel. The comparator is used for deciding relative magnitudes and substantial identity between Z values. In the case where the output of the comparator represents the decision on an approximate identity, the pixel write section sums the proportions contained in respective pixel information and determines pixel information to be written.

According to the invention, the comparator decides the relative magnitudes and substantial identity between the Z values in the pixel information stored in the pixel memory and the pixel information newly converted by the pixel generator. In the case where the decision is substantial identity, the proportions for the respective pixel information are summed to each other thereby to determine the pixel information to be written. Even when a plurality of figures are adjacent to each other, therefore, the connections can be correctly displayed.

Now the invention will be specifically described with reference to drawings. In order to display a three-dimensional figure antialiased according to the method of the invention, the color of a given pixel may be plotted or drawn or painted in an image memory in accordance with the proportion that a particular figure covers or occupies the pixel. If the color is to be determined, however, the background color and the color of a figure already written must be taken into consideration.

FIGS. 3A, 3B, 3C show how the color of a pixel 11 occupying a part of a triangle already plotted is to be determined in accordance with the three-dimensional positional relations with a figure to be newly plotted. It is to be noted that the pixel 11 is shown in enlarged form in FIGS. 3A to 3C.

FIG. 3A shows the case in which a new triangle 13 is plotted over (in the foreground of) an existing triangle 12. The color of the pixel can be determined by mixing (i) the color of the triangle 13 in the proportion of the area that the triangle 13 occupies the pixel 11 to the area of pixel 11, (ii) the color of the triangle 12 in the proportion of the area the triangle 12 occupies the pixel 11 subtracted by the area the triangle 13 occupies the pixels 11 to the area of pixel 11, and (iii) the background color in the proportion of the area not covered by the triangles 12 and 13 to the area of the pixel 11.

FIG. 3B shows the case in which a new triangle 15 is plotted in contact with the triangle 14 that has already been plotted. In this case also, the color of the pixel 11 can be obtained by mixing the colors of the triangles 15, 14 and and the background color in the same manner as in the case of FIG. 3A.

FIG. 3C represents the case in which a new triangle 17 is plotted under (behind) a triangle 16 already plotted. The proportion that is represented by the pixel 11 reflecting the color of the triangle 16 in the foreground remains unchanged, while the color of the triangle 17 in the background is mixed in the proportion of the area not covered by the triangle 16 to the area of the pixel 11.

For this computation to be carried out, the depth information are rearranged for each triangle and computed sequentially from the foreground. This rearrangement processing, however, becomes enormous with an increased number of figures, resulting in a deteriorated performance. According to the invention, there are provided a plurality of sets of the color of a given pixel as viewed from the foreground, the depth of the pixel and the proportion in which the figure occupies the pixel. The depth information are reordered appropriately in accordance with the depth of the location of a new triangle, thereby updating the display color and the proportions in the pixel. As a consequence, the depth information can always be held correctly at pixel level, and thus the color for each case shown in FIG. 3 can be determined.

Further, to be able to decide that the depth of pixels for adjacent triangles are equal to each other, the depth of each pixel must be accurately determined.

According to the invention, this equality determination has some margin thereby eliminating the necessity of accurate determining of the depths. More specifically, in spite of the inherent need of determining the depth information at the point where each triangle contacts, arrangement is made that the contact condition of a triangle can be decided by a simple computation for determining the depth information at the center of a given pixel on an edge of the triangle in the manner used with a normal three-dimensional display apparatus.

DESCRIPTION OF THE PREFERRED EMBODIMENTS

Embodiments of the invention will be described below with reference to FIGS. 1, 2, 4, 5, 6, 7, 8 and 9.

Figure 1:
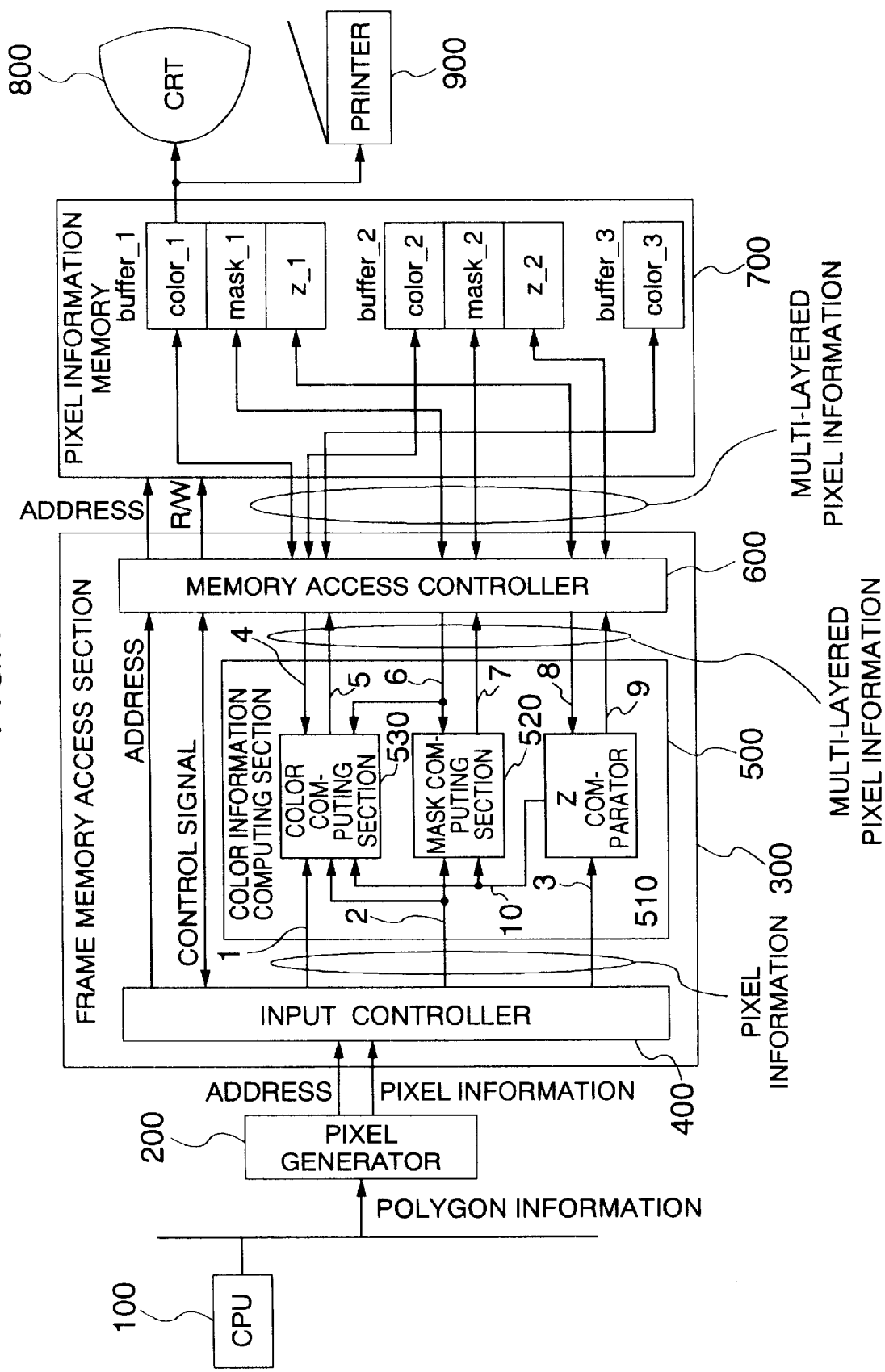
FIG. 1 is a diagram showing a system configuration of a graphic display apparatus according to an embodiment of the invention.

First, the system configuration of a graphic display apparatus according to an embodiment of the invention is described with reference to FIG. 1. This system comprises a CPU 100 for issuing polygon information making up a figure, a pixel generator 200 for receiving the polygon information and generating pixel information internal to and on the edges of a polygon, a frame memory (FM) access section 300 for processing the pixel information and writing multi-layered pixel information in a pixel information memory 700, the pixel information memory 700 for holding display pixel information representing a display color and multi-layered pixel information including the depth information and the proportion that each polygon occupies a pixel, and a CRT 800 for always reading and displaying the display pixel information of the pixel information memory 700 or a printer 900 for reading and printing the display pixel information of the pixel information memory 700.

First, the CPU 100 generates and sends to the pixel generator 200 polygon information on a triangle or the like making up a figure in accordance with a geometry program. This polygon information is given by the x, y and z coordinates and brightness of each vertex. The pixel generator 200, which is supplied with the polygon information from the CPU 100 including the positional coordinate (x, y, z coordinates) in the device coordinate system and the color information (R, G, B) for each vertex, computes the address of the coordinate (x, y) of the pixel inside and on an edge of the polygon, the depth information (Z value) representing the pixel information, the color information (R, G, B values) and the mask value providing the proportion in which the polygon occupies the pixel. The frame memory access section 300 generates a new multi-layered pixel information on the basis of the pixel information computed by the pixel generator and the multi-layered pixel information of the same address as read from the pixel information memory 700 and writes the new multi-layered pixel information in the same coordinate of the pixel information memory 700. The CRT 800 or the printer 900 reads and displays or prints the color information on part of the multi-layered pixel information stored in the pixel information memory 700.

The operation of the pixel generator 200 will be described with reference to the case of plotting a triangle as an example. The polygon information is given by the Z value representing the depth information and the color information R, G, B at each vertex. In order to obtain information at each pixel from these information at each vertex, the Z value at a representative point in each pixel is obtained by interpolation from the information at each vertex, and then the information at each representative point is given as representative pixel information. Linear interpolation is frequently used as an interpolation method, and the Gouraud shading is well known for linear interpolation of color information. The representative point is conveniently located at the center of the pixel.

The shape of the pixel is assumed to be a square and the proportion of the area in which the polygon occupies the pixel is given as a mask value. The area proportion can be determined by known methods such as one disclosed in JP-A-5-290177. A proportion other than the area proportion may be used for the mask value, and a method for determining the proportion using the Gaussian filter is widely known.

The pixel generator 200 applies to the frame memory access section 300 an address representing the pixel coordinate (x, y) and the pixel information including the Z value, the color information and the mask value at the particular address.

Now, the configuration of the frame memory access section 300 is described. The frame memory access section 300 includes an input controller 400, a memory access controller 600 and a pixel information computing section 500. The input controller 400 receives the address (x, y) and the pixel information at the particular address from the pixel generator 200 and applies the same address to the memory access controller 600 and the pixel information to the pixel information computing section 500. The memory access controller 600, upon receipt of the pixel address from the input controller, sends the address and a read signal to the pixel information memory 700, and the multi-layered pixel information for the address received from the pixel information memory 700 to the pixel information computing section 500. The pixel information computing section 500 computes a new multi-layered pixel information from the pixel information and the multi-layered pixel information, and sends the result of computation to the memory access controller 600. The memory access controller 600 sends the new multi-layered pixel information together with a write signal to and loads them in the pixel information memory 700.

Now, the configuration and operation of the pixel information memory 700 will be described. According to this embodiment, the pixel information memory 700 has the configuration of storing the two-layered pixel information as multi-layered pixel information. In other words, the pixel information memory 700 stores the color information, Z values and mask values for the uppermost to the second polygons in the hierarchy obtained by Z comparison and the color information for the third and subsequent tiers.

More specifically, the pixel information memory 700 includes a buffer_1 for storing the color information (color_1), Z value (z_1) and the mask value (mask_1) for the uppermost polygon in the hierarchy, a buffer_2 for storing for storing the color information (color_2), Z value (z_2) and the mask value (mask_2) for the uppermost to the second polygons, and a buffer_3 for storing the color information (color_3) for the uppermost to the third and subsequent polygons.

Figure 4:
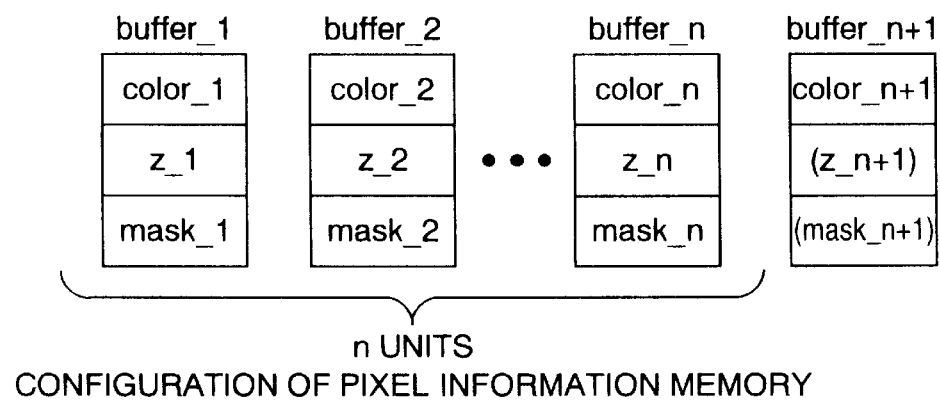
FIG. 4 is a diagram showing a configuration of a pixel information memory.

Generally, the pixel information memory 700 can alternatively be configured to store n-layered pixel information (n: natural number of 1 or more). The configuration of a pixel information memory having such a structure is shown in FIG. 4. In such a case, the pixel information memory includes a buffer_k for storing the mask value (mask_k), the Z value (z_k) and the color information (color_k) for the uppermost polygon to the polygon having the k-th ($1 \leq k \leq n$) Z value in the above-mentioned hierarchy, and a buffer_n+1 for storing at least the color information (color_n+1). Further, the buffer_n+1 may alternatively include a Z value (z_n+1) and a mask value (mask_n+1) in addition to the color information (color_n+1).

Figure 5:
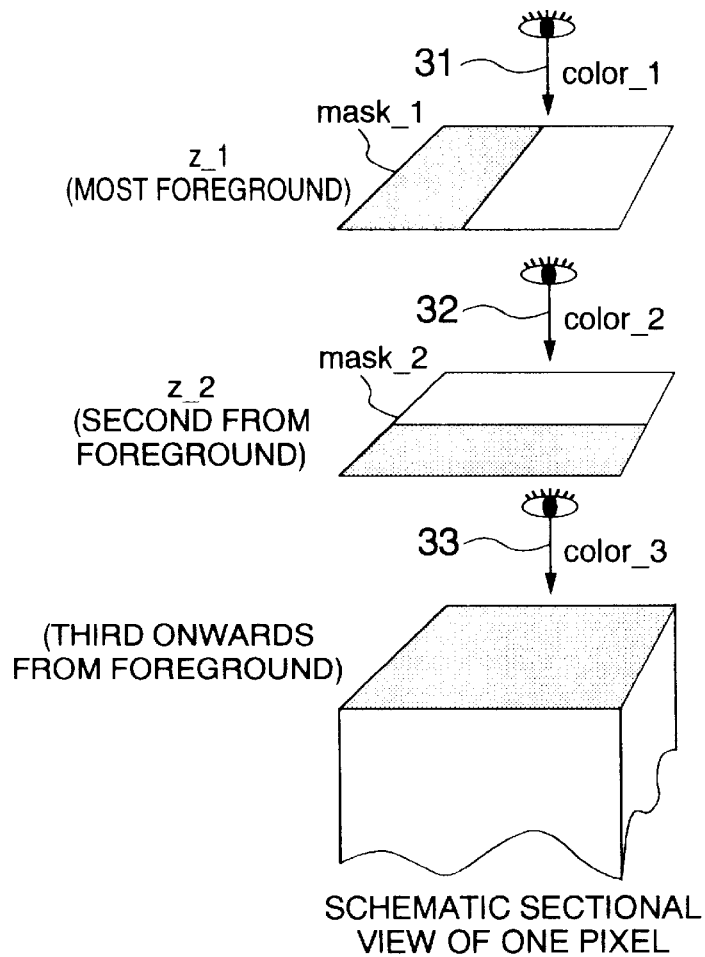
FIG. 5 is a schematic sectional view showing a pixel.

What color information, Z value and mask value are stored for each pixel will now be described with reference to FIG. 5. z_1 represents the Z value for the pixel of the uppermost polygon, and z_2 the Z value of the second polygon from the top. The polygons whose Z values are determined to be identical are assumed to reside at the same level from the top, and those polygons determined to be immediately below are assumed to be at the next level. Zero (0) is stored at z_1 and z_2 as an initial value while nothing is plotted at the pixel. Under this condition, z_1=z_2. As a result, the relation holds that z_1 $\geq$ z_2. The polygon determined to reside at the k-th level from the top is referred to as a level-k polygon or a polygon associated with level k, and the Z value representing level k as the Z value of level k, and the union of all the polygons at level k as a level-k figure. Classifying polygons this way permits the pixels of polygons in contact with each other to be grouped into the same level.

mask_1 represents the proportion in which the level-1 figure occupies the pixel and is computed as the total of mask values of level-1 polygons. Generally, the proportion that a level-k figure occupies the pixel is referred to as the level-k mask value. mask_2 is a mask value of level 2. The initial value of mask_1 and mask_2 is zero.

color_1 represents the mean color of the pixel as viewed from an observer's eye 31, i.e., the mean value of the colors of polygons plotted on the pixel as weighted taking overlaps as viewed from the observer's eye 31 into consideration. The addition of colors and the multiplication of the mask value are carried out for R, G and B independently. The case under consideration involves two-layered pixel information stored in the pixel information memory 700, and therefore, the Z values of only up to level 2 are stored. Consequently, the polygons above level 3 are considered at the same level in an apparently overlapped form. In other words, they are processed as polygons above level 3. color_2 is the mean color of the pixel as viewed from an observer's eye 32, i.e., the mean value of the colors of the polygons of and above level 2 plotted in the pixel as weighted from the mask values taking the overlapping into consideration as viewed from the observer's eye 32. Similarly, color_3 is the mean value of the color of the pixel as viewed from an observer's eye 33.

Generally, the mean value obtained by weighting the color of a level-k polygon by the proportion of each mask value to the level-k mask value is referred to as the color of a level-k color, and the mean value obtained by weighting the color of polygons at and above level k by the mask values taking into consideration the overlapping as viewed from an observer's eye immediately before the level-k Z value is referred to as the color of the k-th observer's eye.

More specifically, z_1, z_2 store the Z values of level 1 and level 2 respectively, mask_1, mask_2 the mask values of levels 1 and 2 respectively, and color_1, color_2, color_3 the colors at the first, second and third observers' eyes respectively. In the process, color_1 represents a display color. Any color may be used for initialization. For initialization, however, the same color is required to be stored for color_1, color_2 and color_3.

The mask value considering the overlapping is called a hierarchical mask value. A simple method is used here for determining a hierarchical mask value. The mask value of level 1 is employed directly as a hierarchical mask value. The hierarchical mask value for level 2, on the other hand, is obtained by multiplying the mask value of level 2 by the proportion of the area not covered by the level-1 figure. In other words, the following equation holds.

Level-2 hierarchical mask value=(1−level-1 mask value)×level-2 mask value Generally, the hierarchical mask value of level k is computed by the following equation.

Level-k hierarchical mask value=(1−level-1 mask value)×(1−level-2 mask value)×. . . ×(1−level-(k-1) mask value)×level-k mask value The hierarchical mask value of a polygon associated with level k is assumed to be the level-k hierarchical mask value proportionally distributed by the mask value of each polygon associated with level k. More specifically, the hierarchical mask value of a polygon A associated with level k is computed according to the following equation.

Hierarchical mask value of polygon A associated with level k=(1−level-l mask value)×(1−level-2 mask value)×. . . ×(1−level-(k-1)mask value)×mask value of polygon A As described above, the pixel information memory 700 stores the multi-layered color information, depth information and mask information. The pixels for final display, however, are stored in color_1, which is output to the CRT 800 or the printer 900.

Now, the operation of the pixel information computing section 500 is described. The pixel information computing section 500 includes a Z comparator 510, a mask computing section 520 and a color computing section 530. (signal lines, signals and contents of signals are hereinafter labelled by the same symbol unless there is fear of any misunderstanding.)

The input to the Z comparator 510 includes z_new(3) from an input controller 400 and "z in (8)" from a memory access controller 600. "z in (8)" represents a combination of the level-1 Z value "z_1 in" for the multi-tiered pixel information of the pixel information memory 700 and the level-2 Z value "z_2 in". The output of the Z comparator includes z_comp(10) to the mask computing section 520 and the color computing section 530 and "z out (9)" to the memory access section 600. z_comp is the result of comparison between z_new, "z-1 in" and "z_2 in". "z out" is a combined representation of level-1 Z value "z_1 out" and the level-2 Z value "z_2 out" in the multi-layered pixel information making up the output to the pixel information memory 700.

The relation "z_1 in">"z_2 in" holds between "z_1 in" and "z_2 in". The relative magnitudes between z_new, "z_1 in" and "z_2 in", therefore, is classified into the following five cases.

(A) z_new>z_1 in (B) z_new=z_1 in (C) z_1 in>z_new>z_2 in (D) z_new=z_2 in (E) z_2 in>z_new The decision for cases (B) and (D), however, is not necessarily that of strict equality but may have some degree of margin as described later. The Z comparator 510 decides which of the above-mentioned five cases applies and sends the result as z_comp to the mask computing section 520 and the color computing section 530 for performing the following processing according to respective cases.

z_new is set to "z_1 out" and "z_1 in" to "z_2 out" in the case where z_comp is (A), "z_1 in" is set to "z_1 out" and "z_2 in" to "z_2 out" in the case of (B), "z_1 in" to "z_1 out" and z_new to "z_2 out" in the case of (C), "z_1 in" is set to "z_1 out" and "z_2 in" to "z_2 out" in the case of (D), and "z_1 in" to "z_1 out" and "z_2 in" to "z_2 out" in the case of (E).

The input of the mask computing section 520 includes "mask_new (2)" from the input controller 400, "mask in (6)" from the memory access controller 600 and z_comp. "mask in" is a representation of "mask_1 in" of level 1 combined with "mask_2 in" of level 2 in the pixel information memory 700. The output of the mask computing section 520 includes "mask out (7)" to the memory access controller 600. "mask out" is a representation of "mask_1 out" of level 1 and the mask value "mask_2 out" of level 2 in combination.

The mask computing section performs one of the following five processings in accordance with z_comp.

The mask value mask_new is set to "mask_1 out" and mask_1 to "mask_2 out" in the case where z_comp is (A), "mask_1 in+mask_new" to "mask_1 out" and "mask_2 in" to "mask_2 out" in the case where z_comp is (B), "mask_1 in" to "mask_1 out" and mask_new to "mask 2 out" in the case where z_comp is (C), "mask_1 in" to "mask_1 out" and "mask_2 in +mask_new" to "mask_2 out" in the case where z_comp is (D), and "mask_1 in" to "mask_1 out" and "mask_2 in" to "mask_2 out" in the case where z_comp is (E).

In cases (B) and (D), "mask_1 in+mask_new" and "mask_2 in+mask_new" may exceed unity. If such is a case, the operation is performed to set them to unity. This operation is equivalent to the one in which mask_new is compared with, say, "1-mask_1 in", that is, the vacancy of the mask value at level 1, and the smaller one is employed anew as mask_new.

The input to the color computing section 530 includes "color_new (1)" and "mask_new (2)" from the input controller 400, "color in (4)" and "mask in (6)" from the memory access controller 600, and "z_comp (10)" from the Z comparator 510. "color in" is a combined representation of the color "color_1 in" for the first observer's eye, the color "color_2 in" for the second observer's eye and the color "color_3 in" for the third observer's eye in the pixel information memory 700. The output of the color computing section 530 is "color out (5)" to the memory access controller 600. "color out" is a combined representation of the color "color_1 out" for the first observer's eye, the color "color_2 outt" for the second observer's eye and the color "color_3 out" for the third observer's eye in the pixel information memory 700.

The color computing section performs one of the following five processings in accordance with z_comp.

"color_2 in" is set to "color_3 out", "color_1 in" to "color_2 out", and "color_1 in +(color_new−color_1 in)× mask_new" to "color_1 out" in the case where z_comp is (A); "color_3 in" is set to "color_3 out", "color_2 in" to "color_2 out" and "color_1 in+(color_new−color_2 in)× mask_new" to "color_1 out" in the case where z_comp is (B); "color_2 in" is set to "color_3 out", "color_2 in+ (color_new−color_2 in)×mask_new" to "color_2 out" and "color_1 in+(color_new color_2 in)×(1−mask_1 in)× mask_new" to "color_1 out" in the case where z_comp is (C); "color_3 in" is set to "color_3 out", "color_2 in+ (color_new−color_3 in)×mask_new" to "color_2 out", and "color_1 in+(color_new−color_3 in)×(1−mask_1 in)×mask_new" to "color_1 out" in the case of (D); and "color_3 in+(color_new−color_3 in)×mask_new" is set to "color_3 out", "color_2 in+(color_new−color_3 in)×(1 mask_2 in)×mask_new" to "color_2 out" and "color_1 in+(color_new−color_3 in)×(1−mask_1 in)×(1−mask_2 in)×mask_new" to "color_1 out" in the case where z_comp is (E).

In cases (B) and (D), however, the mask value at levels 1 and 2 may exceed unity. The operation similar to that in the mask computing section 520, therefore, is performed in which mask_new is compared with "1 mask_1 in", that is, the vacancy of the mask value at level 1, and the smaller one is newly selected as mask-new. In other words, mask_new for (B) means "min (mask_new, mask_1 in)", and mask_new for (D) represents "min (mask_new, mask_2 in)".

Figure 6:
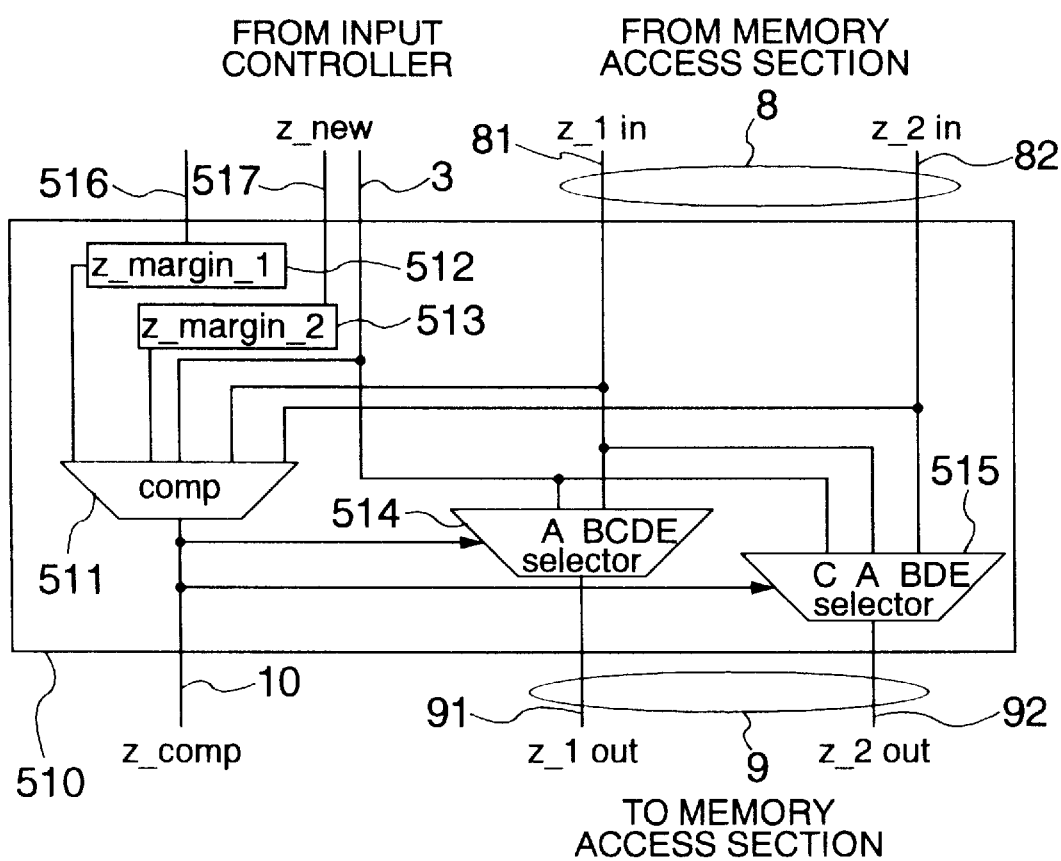
FIG. 6 is a block diagram showing an internal structure of a Z comparator.

FIG. 6 shows the configuration of the Z comparator 510.

The input to the comparator 511 includes "z_1 in (81)" and "z_2 in (82)" from the memory access controller 600, "z_new (3)" from the input controller 400, an output w_1 of a register z_margin_1 512 and w_2 from a z_margin_2 register 513. The z-margin registers 512 and 513 are for holding the margin of equality decision in making Z comparisons. Suppose w is a margin for equality decision. In the case where x and y hold the relation y+w>x>y−w, it is decided that x and y are equal to each other. The values held in the register z_margin_1 512 and the register z_margin_2 513 can be set directly and dynamically from the CPU 100 or in the pixel information computing section 500 on the basis of the input from the pixel generator 200 and the pixel information memory 700 in accordance with the inputs 516 and 517 respectively.

Figures 9, 10:
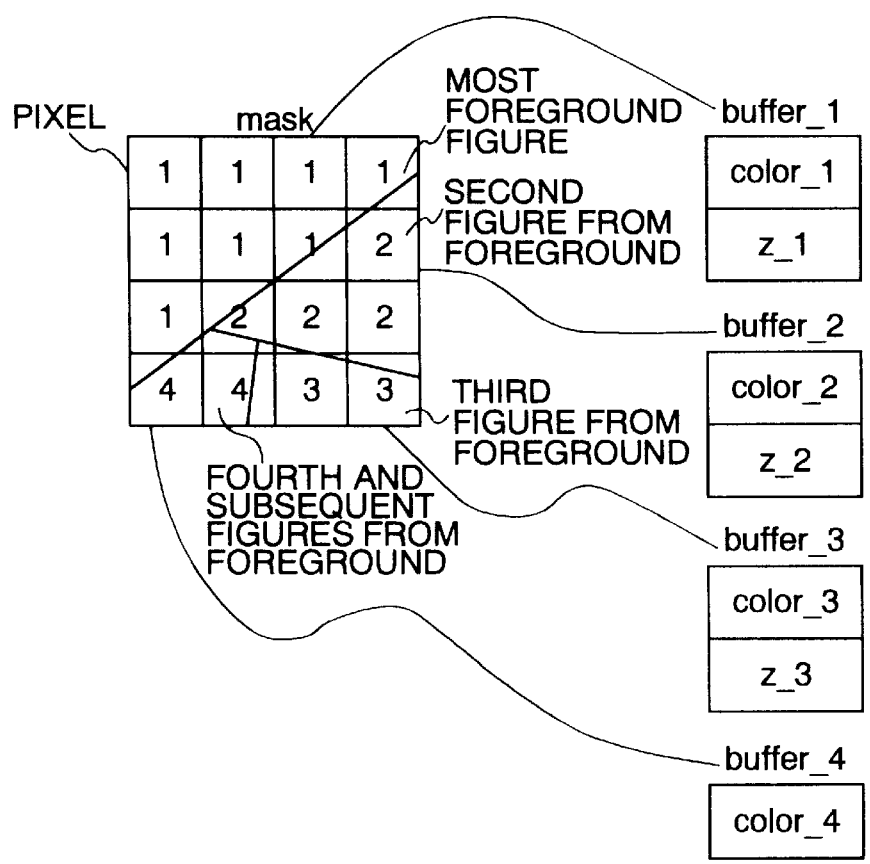
FIG. 9 is a diagram for explaining input conditions and output of a comparator.
FIG. 10 is a diagram showing a configuration for holding area information in a pixel information memory according to another embodiment of the invention.

The output of the comparator 511 is "z_comp (10)". The "z_comp (10)" is a 5-bit signal and labelled A, B, C, D and E in that order from the high-order bit. The relation between input conditions and output is shown in FIG. 9. Only one bit of A to E assumes "1". The values B and D depending on the input values can be true simultaneously. In that case, assuming that only the relation B holds, the output is set according to (B). More specifically, strictly speaking, D can be written as min(z_1 in−w_1, z_2 in+w_2)≧z_new≧z_2 in−w_2. Under this alert, A to E are mutually exclusive and the output of the comparator 511 is determined uniquely without any conflicts.

The register z_margin_1 512 and the register z_margin_2 513 input to the comparator 511 store margin w_1 for equality decision between z_new and "z_1 in (81)" and margin w_2 for equality decision between z_new and "z_2 in (82)", respectively. The equality decision between the Z value of level k stored in the pixel information memory 700 and the Z value of the pixel information generated by the pixel generator 200 is the decision as to whether the particular pixel information is associated with level k or not. More specifically, decision is made as to whether a polygon newly developed is in contact with a level-k polygon already developed. As a result, it is possible that the decision on contact relation may be erroneous unless a margin is allowed appropriately. The margin may be a constant, but preferably takes into consideration the change rate of "z_1 in" or "z_2 in", the difference between "z_1 in" and "z_2 in", etc. Though not shown in FIG. 6, the register z_margin_1 512 and the register z_margin_2 513 can be rewritten by the CPU 100.

On the other hand, "z_comp (10)" which is the output of the comparator 511 is used as a selection control signal for all the selectors in the pixel information computing section. For each selector in FIGS. 6 to 8, the conditions selected for input signals are shown by attaching symbols A to E of z_comp.

A given selector 514 outputs z_new when z_comp is (A), and outputs "z_1 in" for (B), (C), (D) or (E).

The input to the selector 514 includes "z_new (3)", "z_1 in (81)" and a control signal "z_comp (10)", of which "z_new (3)" or "z_1 in (81)" is selected and output to "z_1 out (91)".

The input to the selector 515 include "z_new (3)", "z_1 in (81)", "z_2 in (82)" and a control signal "z_comp (10)", of which "z_new (3)", "z_1 in (81)" or "z_2 in (82)" is selected and output to "z_2 out (92)". The selector 515 selects z_new for (C), "z_1 in" for (A) and "z_2 in" for other cases.

Figure 7:
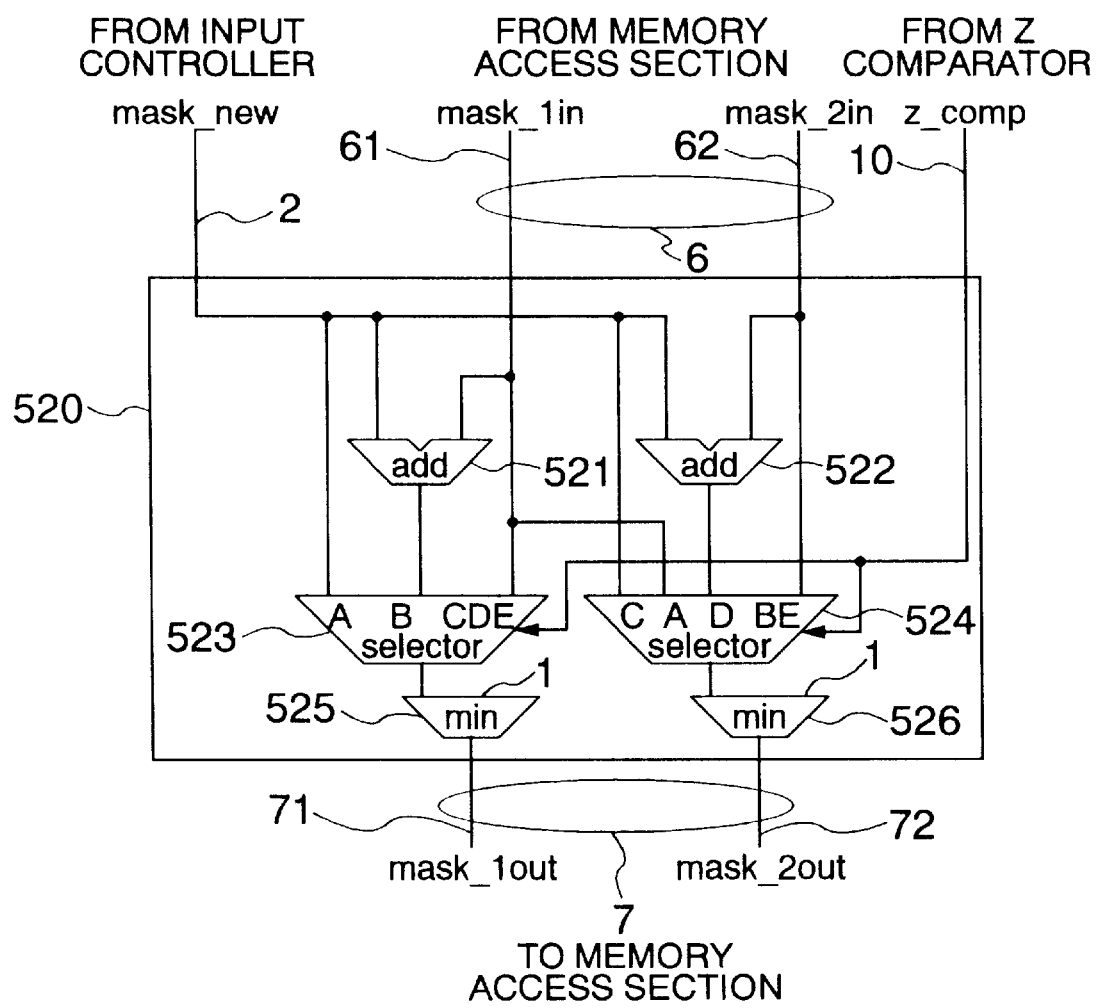
FIG. 7 is a block diagram showing an internal structure of a mask computing section.

FIG. 7 shows the configuration of the mask computing section 520. The input to the mask computing section 520 includes "mask_new (2)" from the input controller 400, "mask_1 in (61)", "mask_2 in (62)" from the memory access controller 600 and the control signal "z_comp (10)" from the Z comparator 510.

The output of the mask computing section 520 includes "mask_1 out (71)" and "mask_2 out (72)" to the memory access controller 600.

The input to an adder 521 includes "mask_new (2)" and "mask_1 in (61)". The result of adding these elements is output to the selector 523. The input to the adder 522 includes "mask_new (2)" and "mask_2 in (62)", the sum of which is output to the selector 524.

The input to the selector 523 includes "mask_new (2)", the sum produced by the adder 521, "mask_1 in (61)" and a control signal "z_comp (10)", so that "mask_new (2)" is selected for (A), the sum of the adder 521 for (B), and "mask_1 in (61)" for other cases, all of which are output to a saturator 525. The input to the selector 524 is "mask_new (2)", the sum of the adder 522, "mask_1 in (61)", "mask_2 in (62)" and the control signal "z_comp (10)", and selected as "mask_new (2)" for (C), "mask_1 in (61)" for (A), the sum of the adder 522 for (D) and "mask_2 in (62)" for other cases, all of which are applied to a saturator 526.

The saturator 525 is supplied with the output of the selector 523 and 1, of which the smaller one is output as "mask_1 out (71)". The saturator 526 is supplied with the output of the selector 524 and 1, of which the smaller one is output as "mask_2 out (72)". In other words, both the saturators 525 and 526 produce a value not exceeding 1.

Figure 8:
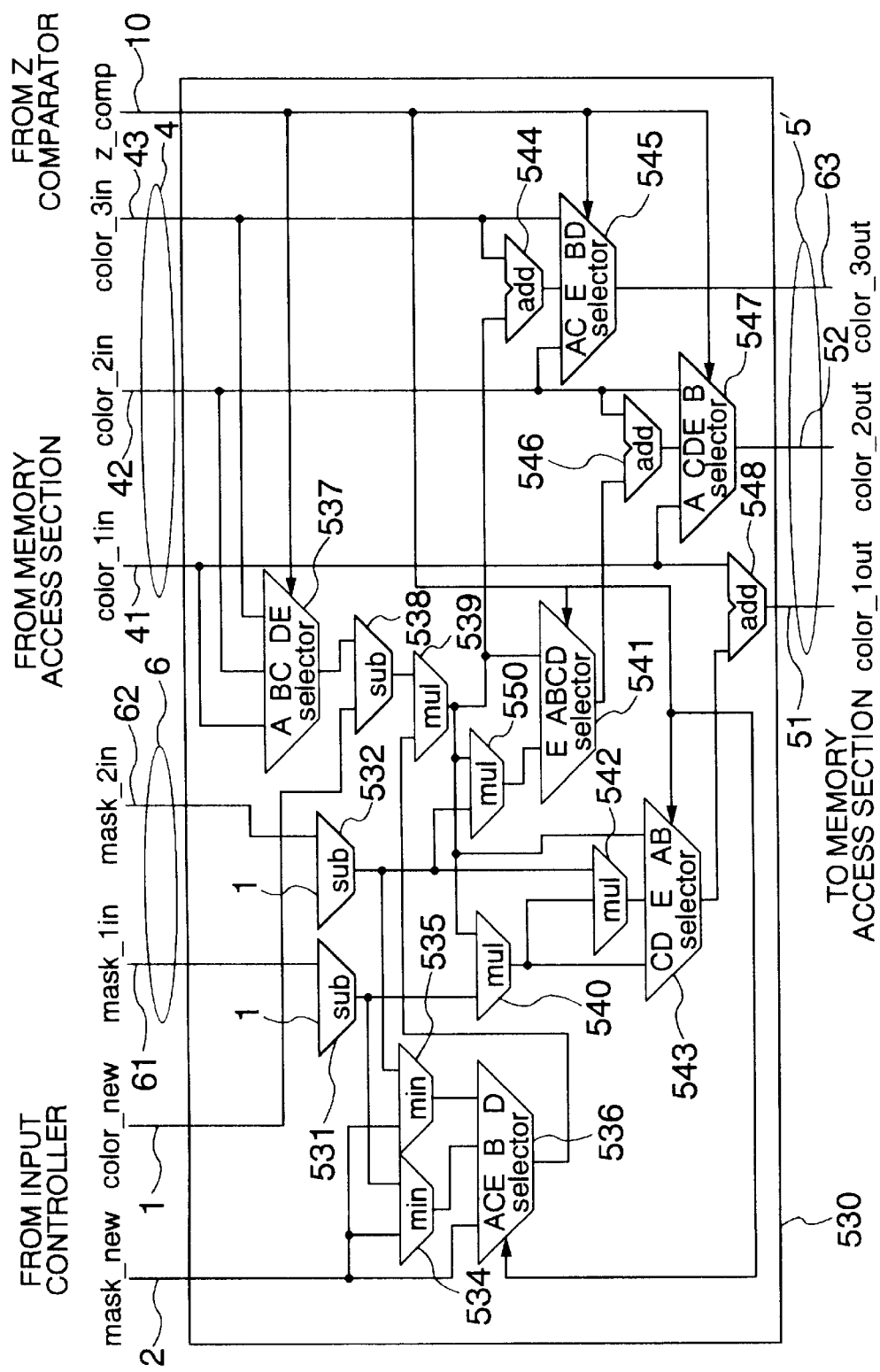
FIG. 8 is a block diagram showing an internal structure of a color computing section.

Next, the configuration of the color computing section 530 is shown in FIG. 8. The input to the color computing section 530 includes "mask_new (2)" and "color_new (1)" from the input controller 400, "mask_1 in (61)", "mask_2 in (62)", "color_1 in (41)", "color_2 in (42)" and "color_3 in (43)" from the memory access controller 600, and "z_comp (10)" from the Z comparator 510, while the output from the color computing section 530 includes "color_1 out (51)", "color_2 out (52)" and "color_3 out (53)" to the memory access controller 600.

A subtractor 531 is supplied with "mask_1 in (61)" and produces the unity less "mask_1 in (61)". The subtractor 532 is supplied with "mask_2 in (62)" and outputs unity less "mask_2 in (62)". The saturator 534, which is supplied with "mask_new (2)" and the output of the subtractor 531, outputs the smaller one of the two to the selector 536. The saturator 535, which is supplied with "mask_new (2)" and the output of the subtractor 532, outputs the smaller one of the two to the selector 536. The selector 536, which is supplied with "mask_new (2)", the output of the saturator 534, the output of the saturator 535 and the control signal "z_comp (10)", selects the output of the saturator 534 for (B), the output of the saturator 535 for (D) and mask_new (2) for other cases, which outputs are applied to a multiplier 539. The output of the selector 536 is the sum of "mask_new (2)" and the mask value for each level, which sum is corrected not to exceed unity.

The selector 537, which is supplied with "color_1 in (41)", "color_2 in (42)", "color_3 in (43)" and a control signal "z_comp (10)", selects "color_1 out (51)" for (A), "color_2 out (52)" for (B) and (C), and "color_3 out (53)" for other cases, and applies the selection to a subtractor 538. The subtractor 538, which is supplied with "color_new (1)" and the output of the selector 537, subtracts the output of the selector 537 from "color_new (1)" and applies the difference to a multiplier 539. The multiplier 539, which is supplied with the output of the selector 536 and the subtractor 538, multiplies them and produces the product.

An adder 544 is supplied with the output of the multiplier 539 and "color_3 in (43)" and applies the sum to a selector 545. The selector 545, which is supplied with "color_2 in (42)", the output of the adder 544, "color_3 in (43)" and a control signal "z_comp (10)", produces "color_2 in (42)" for (A) and (C), the output of the adder 544 for (E) and "color_3 in (43)" for other cases. The output of the selector 545 is "color_3 out (53)".

A multiplier 540, which is supplied with the output of the subtractor 531 and the multiplier 539, multiplies them and outputs the product. A multiplier 550, which is supplied with the outputs of the subtractors 531 and 539, multiplies them and outputs the product thereof. A selector 541 is supplied with the outputs of the multipliers 539, 550 and the control signal "z_comp (10) " and selects the output of the multiplier 550 for (E) and the output of the multiplier 539 for other cases. The selection is applied to an adder 546. The adder 546 which is supplied with the output of the selector 541 and "color_2 in (42)" applies the sum thereof to a selector 547. The selector 547, which is supplied with "color_1 in (41)", "color_2 in (42)", the output of the adder 546 and the control signal "z_comp (10)", selects and produces "color_1 in (41)" for (A), "color_2 in (42)" for (B) and the output of the adder 546 for other cases. The output of the selector 547 is "color_2 out (52)".

A multiplier 542, supplied with the outputs of the subtractor 532 and the multiplier 540, multiplies them and outputs the product thereof to a selector 543. The selector 543 supplied with the outputs of the multipliers 540, 542 and 539 and the control signal "z_comp (10)" selects the output of the multiplier 542 for (E), the output of the multiplier 540 for (C) and (D), and the output of the multiplier 539 for other cases. All these selections are applied to an adder 548. The adder 548 is supplied with the output of the selector 543 and "color_1 in (41)" and outputs the sum thereof. The output of the adder 548 is "color_1 out (51)".

According to the embodiment described above, a Z-level polygon near to the line of eyesight, the colors of polygons from level 3 up to the background, the occupancy ratio and Z values of polygons are always stored in the pixel information memory 700. It is therefore not necessary to develop the polygon information from the polygons nearer to the line of eyesight in advance.

Figure 2:
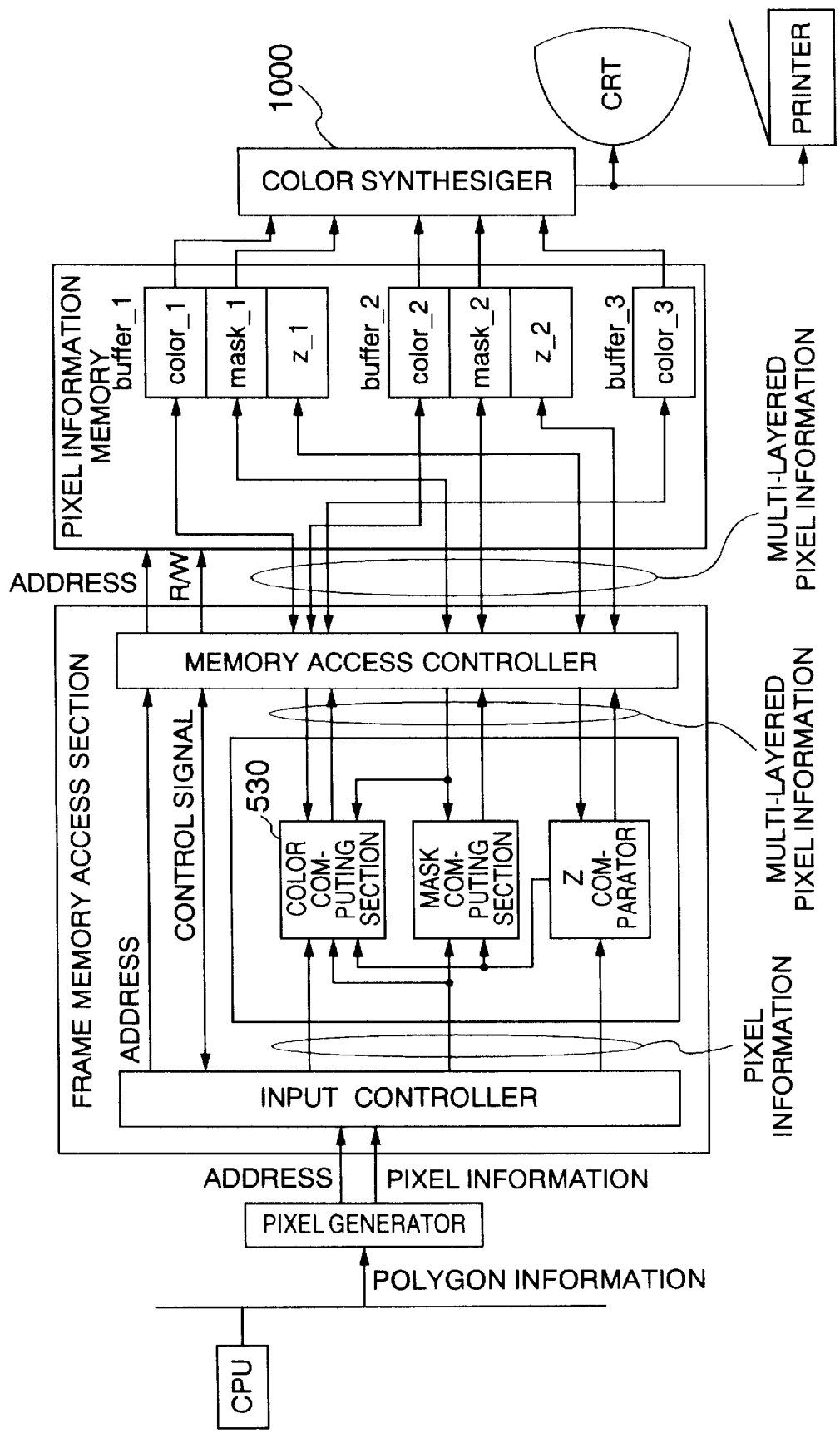
FIG. 2 is a diagram showing a system configuration of a graphic display apparatus according to another embodiment of the invention.

Now, the configuration of another embodiment is shown in FIG. 2. In the embodiment of FIG. 1, the level-k color information of the pixel information memory 700 is stored as a color visible from level k+1 and beyond. According to the embodiment shown in FIG. 2, on the other hand, a color developed from a level-k polygon is stored. color_1, for example, stores the color information of a uppermost polygon of level 1 (nearest to the observer's eye). More specifically, the color computing section of the pixel information computing section operates in accordance with z_comp of the Z comparator in such a manner that "color_2 in+(1−mask_2 in)×color_3 in" is set to "color_3 out", "color_1 in" to "color_2 out" and "color_new×mask_ new" to "color_1 out" for (A); "color_3 in" is set to "color_3 out", "color_2 in" to "color_2 out" and "color_1 in×mask_1 in +color_new×mask_new" to "color_1 out" for (B); "color_2 in+(1−mask_2 in)×color_3 in" is set to "color_3 out", "color_new×mask_new" to "color_2 out" and "color_1 in" to "color_1 out" for (C); "color_3 in" is set to "color_3 out", "color_2 in×mask_2 in+color_new× mask_new" to "color_2 out" and "color_1 in" to "color_1 out" for (D); and "color_3 in +(color_new−color_3 in)× mask_new" is set to "color_3 out", "color_2 in" to "color_2 out" and "color_1 in" to "color_1 out" for (E). The operation of the mask computing section and the Z comparator is the same as in the first embodiment.

The multi-layered pixel information thus stored is delivered to a color synthesizer 1000 and output to the CRT or the printer. The color synthesizer 1000 receives color information and mask information for each level from the pixel information memory 700 and performs the following computations. Specifically, the color of the pixel displayed is determined as "color_1+(1−mask_1)×color_2+(1−mask_ 1)×(1−mask_2)×color_3".

As described above, according to the second embodiment, the color synthesizer 1000 synthesizes the color of a pixel to be displayed by the multi-tiered pixel information, and therefore the contents of computation by the color computing section of the pixel information computing section 500 can be readily realized.

FIG. 10 shows an example method for holding area information as mask information indicating which part of a pixel is covered by a polygon as well as the proportion of area that a figure represents of the pixel.

In the shown example, a pixel is segmented into a 4×4 areas and information on which of the 16 areas is covered by a figure is stored in three layers.

The only effective figure in color computation is the most foreground one of figures covering the areas. For reducing the memory capacity, therefore, area information is held not for each tier but the level of the figure in the most foreground covering each area is preferably held.

The area information is held in a mask. Each area is assigned 2 bits. Four levels including level 1, level 2, level 3 or level 4 or less can be designated as a level of the figure in the most foreground covering each area. An area assigned numeral 1 indicates that the particular area is covered by the figure in the most foreground in a pixel. An area with numeral 2, on the other hand, is not covered by the figure in the most foreground in a pixel but by the second foreground figure. An area carrying numeral 3 represents an area not covered by up to the second foreground figure but by the third figure from foreground. In similar fashion, the area labelled 4 represents the other areas, i.e., those areas not covered by up to the third foreground figure in the pixel.

The Z value and the color for level 1 are held in buffer_1. This also applies to buffer_2 and buffer_3. Information on the color of level 4 and subsequent levels, i.e., the color at the fourth observer's eye is held in buffer_4. The color of each level is held as a color for levels 1, 2 and 3 as in the embodiment shown in FIG. 2. In this case, the system configuration is substantially identical to that of FIG. 2 except that layers are increased from two to three. Processings are somewhat different, however, for the pixel generator, the Z comparator, the mask computing section and the color computing section.

Now, explanation will be made about the operation of the pixel generator, the Z comparator, the mask computing section and the color computing section.

The pixel generator is required as its function to produce the area information as a mask value mask_new. Specifically, mask_new is a 16-bit string representing 16 areas each containing one-bit information (1 when the area is covered, and 0 when not covered) as to whether each area is covered by a figure newly plotted. This bit string stores one-bit information for each area from upper left to right or in top-down sequence.

A method for implementing this algorithm by referencing a table storing mask values using edge information is well known, as shown, for example, in "A New Simple Efficient Antialiasing with Subpixel Masks", Computer Graphics, Vol. 25, Number 4, July 1991.

The processing of the Z comparator is divided into the following seven cases of magnitude relation between z_new and "z_1 in", "z_2 in" and "z_3 in" with the increase from two to three layers.

Figure 3A:
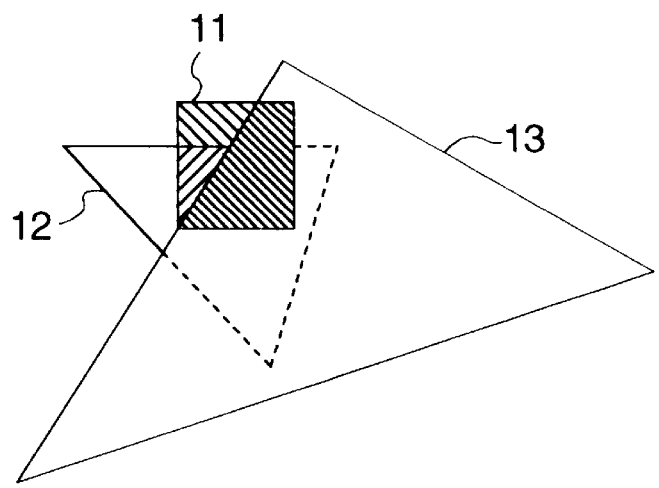
FIGS. 3A, 3B, 3C are diagrams for explaining relative positions between two triangles.
Figure 3B:
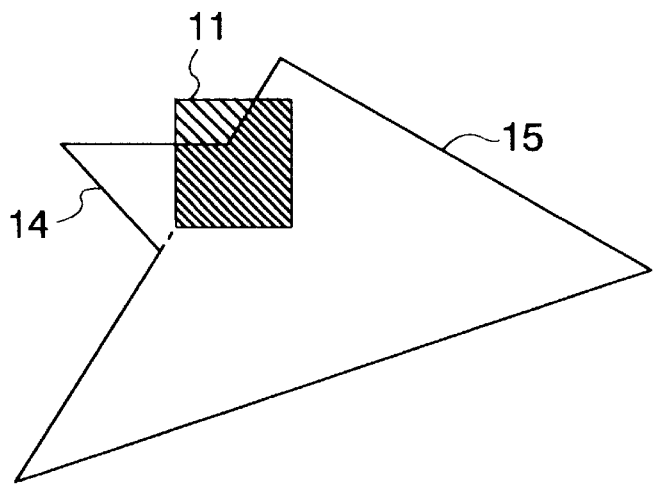
Figure 3C:
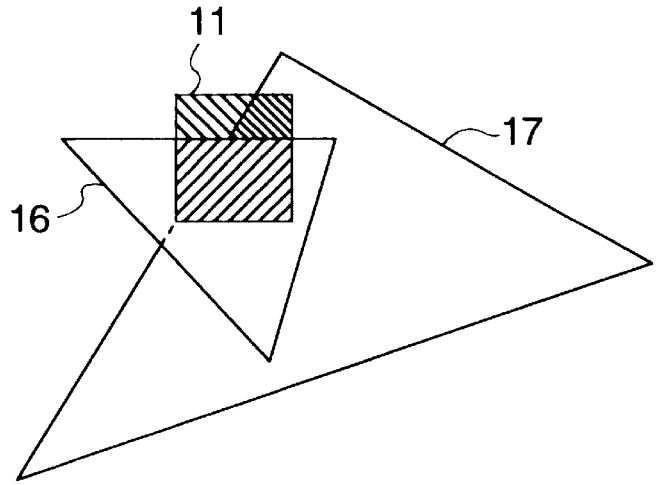

(A) z_new>z_1 in (B) z_new=z_1 in (C) z_1 in>z_new>z_2 in (D) z_new=z_2 in (E) z_2 in>z_new>z_3 in (F) z_new=z_3 in (G) z_3 in>z_new The area information held in mask, when output to the mask computing section, the color computing section and the color synthesizer, are disassembled into "mask_1 in", "mask_2 in", "mask_3 in" and "mask_4 in" In the case under consideration, "mask_1 in" is represented by a 16-bit string having 1 only for the area covered by a level-1 figure (the area having numeral 1 in FIG. 10) and 0 for other areas, while "mask_2 in" gives a 16-bit string having 1 for the area carrying numeral 2 in FIG. 3 and 0 for other areas. The same can be said of "mask_3 in" and "mask_4 in".

Therefore, "mask_k in&mask_1 in" (k, 1=1, 2, 3, 4, and k≠1) represent of a bit string of all zero.

The mask computing section performs different processings as described below for the above-mentioned seven cases in accordance with the result z_comp of Z comparison.

"mask_new" is set to "mask_1 out" and "mask_1 in&~mask_new" to "mask_2 out", and "mask_2 in&~mask_new" to "mask_3 out" for (A); "mask_1 in | mask_new" is set to "mask_1 out", "mask_2 in&~mask_new" to "mask_2 out", and "mask_3 in&~mask new" to "mask_3 out" for (B); "mask_1 in" is set to "mask_1 out", "mask_new&~mask_1" in to "mask_2 out" and "mask_3 in&~mask_new" to "mask_3 out" for (C); "mask_1 in" is set to "mask_1 out", "(mask_2 in&~mask_1 in) | mask_new" to "mask_2 out", and "mask_3 in&~mask_new" to "mask_3 out" for (D); "mask_1 in" is set to "mask_1 out", "mask_2 in" to "mask_2 out" and "mask_new&~mask_1 in&~mask_2 in" to "mask_3 out" for (E); "mask_1 in" is set to "mask_1 out", "mask_2 in" to "mask_2 out" and "(mask_new&~mask_1 in& ~mask_2 in) | mask_3 out" to "mask_3 out" for (F); and "mask_1 in" is set to "mask_1 out", "mask_2 in" to "mask_2 out" and "mask 3 out" to "mask_3 out" for (G).

In the foregoing description, symbols |, & and ~ designate the pool sum, the pool product and the inversion for each bit, respectively. Therefore, mask_k out&mask_1 out (k, 1=1, 2, 3, 4; k≠1) represents an all-zero bit string. "mask_1 out", "mask_2 out", "mask_3 out" and "mask_4 out" are again synthesized into a 32-bit string (2 bits for each area) when stored in mask.

The expression "#mask_1 in" is assumed to represent the total number of 1s included in the bit string "mask_1 in" divided by the total number 16 of areas, i.e., the proportion of area that a level-1 figure represents of a pixel.

In the color computing section, in accordance with z_comp of the Z comparator, "(color_4 in×#(mask_4 in&~mask_new)+color_3 in×#(mask_3 in&~mask_new)/#(mask_4 in | mask_3 in&~mask_new)" is set to "color_4 out", "color_2 in" to "color_3 out", "color_1 in" to "color_2 out" and color_new to "color_1 out" for (A); "color_4 in" is set to "color_4 out", "color_3 in" to "color_3 out", "color_2 in to color_2 out", and "(color_1 in×#(mask_1 in&~mask_new)+color-new×#mask_new)/#(mask_1 in" | mask_new)" to "color_1 out" for (B); and "(color_4 in×#(mask_4 in &~mask_new)+color_3 in×#(mask_in&~(mask_new&~mask_1 in))/#(mask_4 in | mask_3 in&~(mask_new&~mask_1 in"))  is set to "color_4 out", "color_2 in" to "color_3 out", "color_new to "color_2 out" and "color_1 in" to "color_1 out" for (C); "color_4 in" is set to "color_4 out", "color_3 in" to "color_3 out", "(color_2 in×#(mask_2 in&~mask_new)+ color_new×#(mask_new&~mask_1 in"))/#(mask_2 in | (mask_new&~mask_1 in))" to "color_2 out", and "color_1 in" to "color_1 out" for (D); "(color_4 in×# (mask_4 in&~mask_new)+color_3 in×#(mask_3 in&~ (mask_new&~mask_1 in&~mask_2 in))/#(mask_4 in | mask_3 in&~(mask_new&~mask_1 in&~mask_2 in))" is set to "color_4 out ", color_new to "color_3 out", "color_2 in" to "color_2 out", and "color_1 in" to "color_1 out" for (E); "color_4 in" is set to "color_4 out", "(color_3 in×#(mask_3 in&~mask_new)+color_new×# (mask_new&~mask_1 in&~mask_2 in))/#(mask_3 in (mask_new&~mask_1 in&~mask_2 in))" to "color_3 out", "color_2 in" to "color_2 out", and "color_1 in" to "color_1 out" for (F); and "(color_4 in×#(mask_4 in&-mask_new) +color_new×#(mask_new&~mask_1 in&- mask_2 in&-mask_3 in))/#(mask_4 in | (mask_new&~mask-1 in&~mask_2 in&~mask_3 in))" is set to "color_2 out", "color_3 in" to "color_3 out", "color_2 in" to "color_2 out" and "color_1 to color_1 out".

As described above, according to this embodiment, the area information is held as an occupancy ratio, and therefore a more accurate color computation is possible than in the case where the area proportion is held.

According to this invention, connections of adjacent polygons can be correctly displayed without rearranging the sequence of developments of polygons.

We claim:

1. A graphic display apparatus comprising:
   a pixel generator which converts a figure having depth information into pixel information;
   a pixel memory which stores pixel information, each of said pixel information including at least color information, a Z value as depth information and the proportion in which the figure occupies said pixel;
   a comparator which compares the depth information in the pixel information already stored in said pixel memory with the depth information in the pixel information obtained by being converted in said pixel generator for each pixel position and deciding whether one Z value is larger than or substantially equal to the other Z value; and
   a pixel write section which determines and writes the pixel information to be written in said pixel memory in accordance with the output of said comparator;
   wherein said pixel memory includes a plurality of layers based on said Z value, and the pixel information stored in the bottom layer is a combination of information synthesized from the color information of a layer having a Z value of said bottom layer and of at least one other layer having a Z value lower than the Z value associated with said bottom layer.

2. A graphic display apparatus according to claim 1, wherein said comparator decides that said Z values are substantially equal to each other in the case where the difference between said Z values is within a predetermined range.

3. A graphic display apparatus according to claim 2, further comprising means for dynamically setting said predetermined range.

4. A graphic display apparatus according to claim 1, wherein said pixel memory includes a plurality of layers based on said Z value, and each pixel is divided into a plurality of areas, said pixel information including information indicating which one of the layers is associated with each of the areas into which said pixel is divided.

5. A graphic display apparatus according to claim 1, wherein the color information of the pixel to be stored in said pixel memory is calculated on the basis of the color information including the proportion of the pixel information already stored in said pixel memory and the color information including the proportion of the new pixel information generated by said pixel generator.

6. A graphic display apparatus according to claim 1, wherein said pixel write section sums said proportion in each of said pixel information and thereby determines the pixel information to be written in said pixel memory in the case where said comparator decides that the Z values are substantially equal to each other.

7. A graphic display apparatus comprising:
pixel generating means for converting a figure having depth information into pixel information;
pixel memory means for storing said pixel information, each of said pixel information including at least color information, a Z value as depth information and the proportion in which the figure occupies said pixel;
comparator means for comparing the depth information of the pixel information stored in said pixel memory with the depth information of the pixel information obtained by being newly converted by said pixel generator for each pixel position and deciding whether one Z value is larger than or substantially equal to the other Z value; and
pixel write means for determining and writing the pixel information to be written in said pixel memory in accordance with the output of said comparator means;
wherein said pixel memory means includes a plurality of layers based on said Z value, and the pixel information stored in the bottom layer is a combination of the information synthesized from the color information of a layer having the Z value of the bottom layer and at least one other layer having a Z value lower than the Z value associated with said bottom layer.

8. A graphic display apparatus according to claim 7, wherein said comparator means decides that said Z values are substantially equal to each other in the case where the difference between said Z values is within a predetermined range.

9. A graphic display apparatus according to claim 8, further comprising means for dynamically setting said predetermined range.

10. A graphic display apparatus according to claim 7, wherein said pixel memory means includes a plurality of layers based on said Z value, and each pixel is divided into a plurality of areas each having information as said pixel information indicating which one of said layers is associated with said area.

11. A graphic display apparatus according to claim 7, wherein the color information of the pixel to be stored in said pixel memory means is calculated on the basis of the color information including the proportion included in the pixel information already stored in said pixel memory means and the color information including the proportion included in the new pixel information generated by said pixel generating means.

12. A graphic display apparatus according to claim 7, wherein said pixel write means sums said proportion in each of said pixel information and determines the pixel information to be written in said pixel memory means in the case where said comparator means decides that said Z values are substantially equal to each other.

13. A method of providing a graphic display comprising the steps of:
converting a figure having depth information into pixel information by a pixel generating means;
storing said pixel information in pixel memory means, each of said pixel information including at least color information, a Z value as depth information and the proportion that said figure represents of a pixel;
comparing the depth information included in the pixel information stored in said pixel memory means with the depth information included in the pixel information obtained by being converted by said pixel generator for each pixel position and deciding whether said one of said Z values is large than or substantially equal to the other Z value;
determining and writing by said write section the pixel information to be written in said pixel memory means in accordance with the output of said comparator;
wherein said Pixel memory includes a plurality of layers based on said Z value, and the pixel information stored in the bottom layer is a combination of information synthesized from the color information of a layer having a Z value of said bottom layer and of at least one other layer having a Z value lower than the Z value associated with said bottom layer.

14. A method according to claim 10, wherein said pixel write section sums the proportion included in each of said pixel information and determines the pixel information to be written in said pixel memory in the case where said comparator decides that said Z values are substantially equal to each other.

* * * * *